(12) United States Patent
Kawatani

(10) Patent No.: US 7,185,008 B2
(45) Date of Patent: Feb. 27, 2007

(54) DOCUMENT CLASSIFICATION METHOD AND APPARATUS

(75) Inventor: Takahiko Kawatani, Kanagawa (JP)

(73) Assignee: Hewlett-Packard Development Company, L.P., Houston, TX (US)

(*) Notice: Subject to any disclaimer, the term of this patent is extended or adjusted under 35 U.S.C. 154(b) by 525 days.

(21) Appl. No.: 10/373,689

(22) Filed: Feb. 27, 2003

(65) Prior Publication Data
US 2003/0167267 A1   Sep. 4, 2003

(30) Foreign Application Priority Data
Mar. 1, 2002   (JP) ................. 2002-056238

(51) Int. Cl.
*G06F 7/00* (2006.01)
*G06F 17/00* (2006.01)

(52) U.S. Cl. .................. 707/6; 707/4; 707/5; 707/102; 715/500

(58) Field of Classification Search .............. 707/6, 707/5
See application file for complete search history.

(56) References Cited

U.S. PATENT DOCUMENTS

| 6,003,027 | A  | * | 12/1999 | Prager ............................. 707/5 |
| 6,125,362 | A  | * | 9/2000  | Elworthy ......................... 707/6 |
| 6,192,360 | B1 | * | 2/2001  | Dumais et al. ................... 707/6 |
| 6,611,825 | B1 | * | 8/2003  | Billheimer et al. ........... 706/45 |
| 6,704,905 | B2 | * | 3/2004  | Fukushige et al. .......... 715/500 |

FOREIGN PATENT DOCUMENTS

WO   97/33250   9/1997

OTHER PUBLICATIONS

"Expert Network: Effective and Efficient Learning from Human Decisions in Text Categorization and Retrieval", published 1994, by Yiming Yang☐☐http://www.is.informatik.uni-duisburg.de/bib/pdf/unidu/Yang:94.pdf☐☐.*
C.D. Manning and H. Schutze, Foundations of Statistical Natural Language Processing, 1999, The MIT Press, Chapter 16, pp. 575-608.
Zi-Quan Hong et al., "Optical Discriminant Plane for a Small Number of Samples and Design Method of Classifier on the Plane", Pattern Recognition, Elsevier, Kidlington, GB, vol. 24, No. 4, Jan. 1991, pp. 317-324, Document No. XP-000205304, ISSN: 0031-3203.

(Continued)

*Primary Examiner*—Jeffrey Gaffin
*Assistant Examiner*—Chelcie L. Daye
(74) *Attorney, Agent, or Firm*—Lowe Hauptman & Berner, LLP

(57) ABSTRACT

A document is classified into at least one document class by selecting terms for use in the classification from among terms that occur in the document. A similarity between the input document and each class is calculated using information saved for every document class. The calculated similarity to each class is corrected. The class to which the input document belongs is determined in accordance with the corrected similarity to each class.

28 Claims, 7 Drawing Sheets

OTHER PUBLICATIONS

Yoshihiko Hamamoto et al., "A Generalized Orthonormal Discriminant Vector Method for Pattern Recognition", Electronics and Communications in Japan, Part III: Fundamental Electronic Science, Wiley, Hoboken, NJ, US, vol. 77, No. 8, Aug. 1, 1994, pp. 48-56, Document No. XP-000503754, ISSN: 1042-0967, Equations 6,7, Section 3.

Takahiko Kawatani, "Handwritten Kanji Recognition Using Combined Complementary Classifiers in a Cascade Arrangement", Document Analysis and Recognition, 1999. ICDAR'99. Proceedings of the Fifth International Conference on Bangalore, India Sep. 20-22, 1999, Los Alamitos, CA, USA, IEEE Comput. Soc, US, Sep. 20, 1999, pp. 503-506, Document No. XP-010351315, ISBN: 0-7695-0318-7, Sections 2.3, 3.3.

Francesco Ricci et al., "Data Compression and Local Metrics for Nearest Neighbor Classification", IEEE Transactions on Pattern Analysis and Machine Intelligence, IEEE Service Center, Los Alamitos, CA, US, vol. 21, No. 4, Apr. 1999, pp. 380-384, Document No. XP-000833578, ISSN: 0162-8828, Sections 2,3.

Trevor Hastie et al., "Discriminant Adaptive Nearest Neighbor Classification", IEEE Transactions on Pattern Analysis and Machine Intelligence, IEEE Service Center, Los Alamitos, CA, US, vol. 18, No. 6, Jun. 1, 1996, pp. 607-615, Document No. XP-00020142, ISSN: 0162-8828, Sections 1,2.

Takahiko Kawatani et al., "Topic Difference Factor Extraction Between Two Document Sets and Its Application to Text Categorization", SIGIR'02, Proceedings of the 25th. Annual International ACM SIGIR Conference on Research and Development in Information Retrieval. Tampere, Finland, Annual International ACM-SIGIR Conference on Research and Development in Inform, vol. Conf. 25, Aug. 11, 2002, pp. 137-144, Document No. XP-002334774, ISSN: 1-58113-561-0.

Bunke H et al., "Handbook of Character Recognition and Document Image Analysis, Passage", Handbook on Optical Character Recognition and Document Image Analysis, World Scientific Publishing, US, 1997, pp. 665-668, Document No. XP-002401851.

* cited by examiner

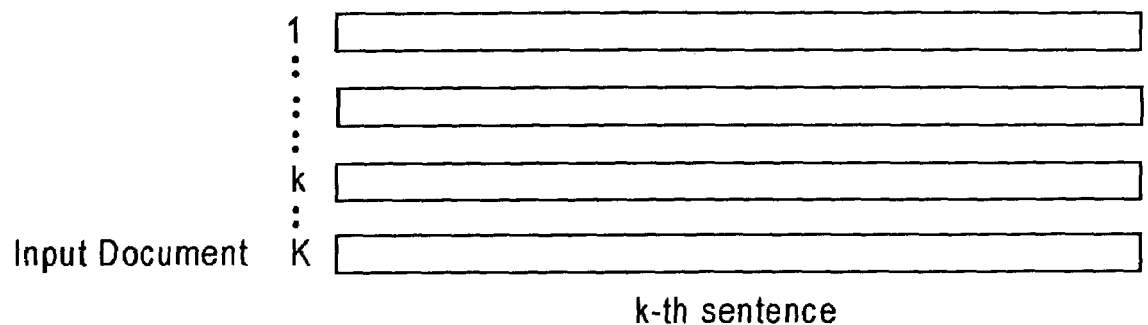
Input Document
k-th sentence
FIG. 3A
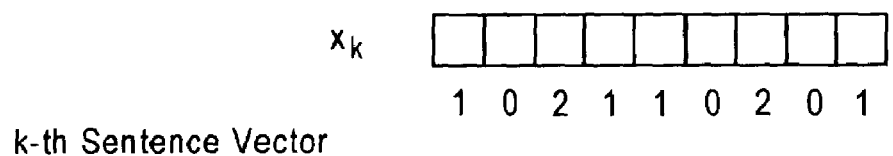
k-th Sentence Vector
FIG. 3B
Document Vector $\quad x = \sum_{k=1}^{K} x_k$
FIG. 3C

DOCUMENT CLASSIFICATION METHOD AND APPARATUS

BACKGROUND OF THE INVENTION

1. Field of the Invention

The present invention relates to natural language processing which includes the classification of documents. More particularly, the invention permits one to exactly extract the distinction between document sets, thereby improving the processing performance.

2. Description of the Related Art

Document classification is a technology for classifying documents into predetermined groups, and has become more important with an increase in the circulation of information. Regarding the document classification, various methods, such as the vector space model, the k nearest neighbor method (kNN method), the naive Bayes method, the decision tree method, the support vector machines method, and the boosting method, have heretofore been studied and developed. A recent trend in document classification processing has been detailed by M. Nagata and H. Hira in "TEXT CATEGORIZATION—SAMPLE FAIR OF LEARNING THEORIES" contained in Proceedings of the Information Processing Society of Japan, Vol. 42, No. 1 (January 2001). In any of the classification methods, information on a document class is described in any form and is collated with an input document. It shall be called the "class model" below. The class model is expressed by, for example, the average vector of documents belonging to each class in the vector space model, the set of the vectors of documents belonging to each class in the kNN method, and a set of simple hypotheses in the boosting method. In order to achieve a precise classification, the class model must precisely describe each class. It may be said that, in the high-performance classification methods hitherto proposed, the class model describes each class more precisely.

In this regard, although many of the classification methods aim at the preciseness of the description of the class model, they do not consider class-model overlapping. In the vector space model or the kNN method, for example, the class model of a certain class also includes information matching with another class. If an overlap exists between the class models, there is a likelihood that it will exist between a certain input document and the class to which the input document does not belong, and can cause a misclassification. In order to eliminate the cause for the misclassification, the class model needs to be described by finding the distinctive information of each class so that class-model overlapping may be reduced.

SUMMARY OF THE INVENTION

In view of the above, according to the present invention, a technique is provided for extracting features which occur in each given class, but which rarely occur in any other class, and features which occur in any other class, but which rarely occur in the given class. A classification scheme including two stages, a main and a sub classifier is constructed so that such features can be effectively used. In the main classification scheme, an existing high performance classification method is adopted, while in the sub classification scheme, the features are used. The main classification scheme is assumed to classify an input document on the basis of the similarity between the input document and each class.

As described below, the features to be used in the sub classification scheme are extracted using all training documents with labels indicating the classes of each individual document. First, in the main classification scheme, for each of the training documents, the similarities are obtained for each class. Documents whose similarities to a pertinent class exceed a preset threshold are judged as belonging to the pertinent class. These documents are divided into a set in which the documents are correctly classified into their proper classes (hereinbelow, called "a given class document set"), and a set in which the documents are classified into the given class document set in spite of belonging to other classes (hereinbelow, called "a competing document set"). Each document is expressed by a set of sentence vectors. Each component of a sentence vector is the frequency of each term occurring in the pertinent sentence, or a quantity corresponding to the frequency, while the dimension thereof is the number of kinds of terms occurring in all of the training documents, or the number of kinds of selected terms. Assume that all of the sentence vectors of all of the documents are projected onto a certain projection axis. The ratio between the sum of the squared projection values from a given class document set and the sum of the squared projection values from the competing document set is preferably adopted as a criterion function that indicates the degree of differences between the sets. The features for use in the sub classification scheme are extracted using the projection axis that maximizes the criterion function.

A plurality of such projection axes can be represented as the eigenvectors of a generalized eigenvalue problem. More specifically, when the criterion function is expressed by the (sum of the squared projection values from the given class document set)/(sum of the squared projection values from the competing document set), the projection axis which maximizes the criterion function has a large value as the sum of the squared projection values from the given class document set and a small value as the sum of the squared projection values from the competing document set. Therefore, the projection axis reflects information that rarely occurs in any competing document and often occurs in the given class. Accordingly, such projection axes are referred to as "positive topic difference factor vectors". In contrast, when the criterion function is expressed by the (sum of the squared projection values from the competing document set)/(sum of the squared projection values from the given class document set), the projection axis which maximizes the criterion function reflects information which rarely occurs in the given class and often occurs in any competing document. Accordingly, such projection axes are referred to as "negative topic difference factor vectors".

In the sub classification scheme, the weighted sum of the squared inner products between the sentence vectors of the input document and a certain number of positive topic difference factor vectors of each class is added to the similarity of the pertinent class obtained in the main classification scheme. The weighted sum of the squared inner products between the sentence vectors of the input document and a certain number of negative topic difference factor vectors of each class is similarly subtracted from the similarity of the pertinent class. The thus corrected similarity is compared with a predetermined threshold for each class.

As stated before, in the present invention, the similarities calculated by the main classification scheme are corrected by the sub classification scheme. If the weighted sum of the squared inner products between the sentence vectors of the input document and the certain number of positive topic difference factor vectors is calculated in a certain class by the sub classification scheme, the positive topic difference factor vectors stipulate features which exist in the class.

Therefore, if the input document belongs to the pertinent class, the above weighted sum usually has a large value, and the similarity is corrected into a large value. On the other hand, if the input document does not belong to the pertinent class, the above weighted sum often has a small value, and the similarity change is small. Further, if the weighted sum of the squared inner products between the sentence vectors of the input document and the certain number of negative topic difference factor vectors is calculated in the certain class, the negative topic difference factor vectors stipulate features which ought not to exist in the class. Therefore, if the input document belongs to the pertinent class, the above weighted sum often has a small value and the similarity change is small. However, when the input document does not belong to the pertinent class, the above weighted sum often has a large value and the similarity is corrected into a small value. Since the similarity is corrected in this manner, the corrections often result in enlarging the similarity to the class to which the input document belongs, and reducing the similarity to the class to which the input document does not belong. Accordingly, the classification precision is improved.

BRIEF DESCRIPTION OF THE DRAWINGS

The foregoing and a better understanding of the present invention will become apparent from the following detailed description of the example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein:

FIGS. 3A–3C are diagrams for explaining a document vector;

DETAILED DESCRIPTION

Figure 1:
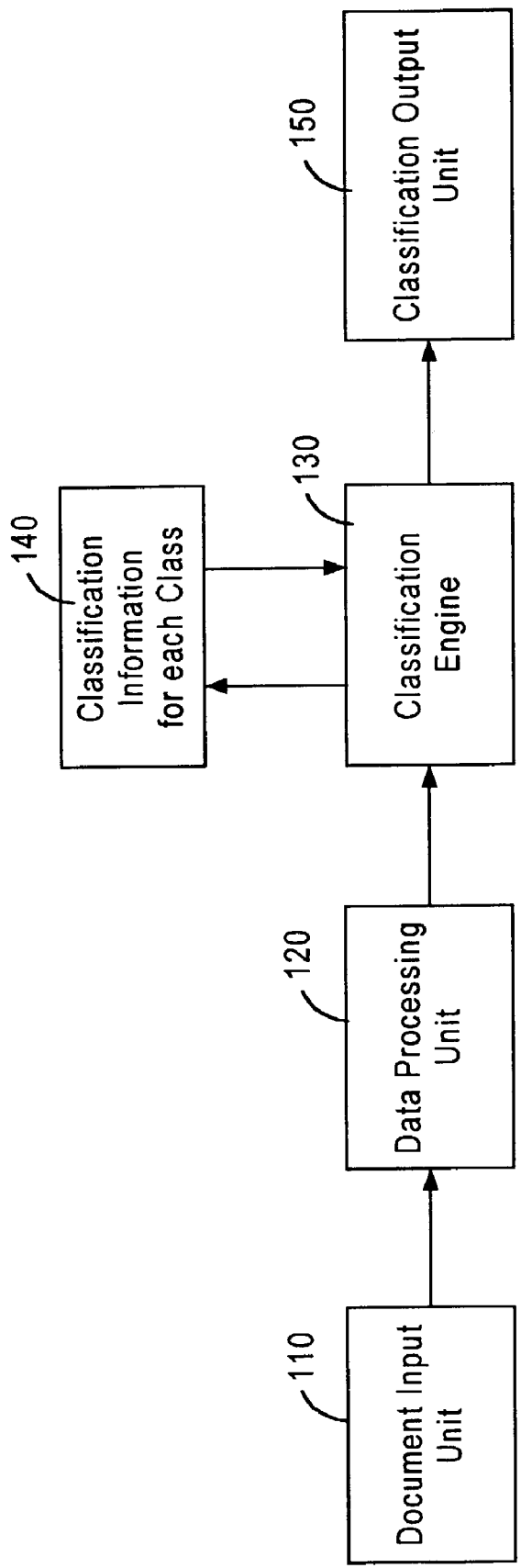
FIG. 1 is a block diagram showing a document classification apparatus according to an embodiment of the present invention.

Before beginning a detailed description of the subject invention, mention of the following is in order. When appropriate, like reference numerals and characters are used to designate identical, corresponding, or similar components in differing drawing figures. Furthermore, in the detailed description to follow, example sizes/models/values/ranges are given, although the present invention is not limited thereto. Arrangements are shown in block diagram form in order to avoid obscuring the invention and also in view of the fact that specifics with respect to implementation of such block diagram arrangements are highly dependent upon the platform within which the present invention is to be implemented, that is, such specifics are well within the purview of one skilled in the art. Where specific details, such as circuits or flowcharts, are set forth in order to describe example embodiments of the invention, it should be apparent to one skilled in the art that the invention can be practiced without, or with variations of, these specific details. Finally, it should be apparent that differing combinations of hard-wired circuitry and software instructions can be used to implement embodiments of the present invention, that is, the present invention is not limited to any specific combination of hardware and software.

FIG. 1 is a block diagram of a document classification apparatus according to an embodiment of the present invention. First, a document to be classified is inputted to a document input unit 110. In a data processing unit 120, the inputted document is subjected to data processing, such as term extraction and document segment extraction. In a classification engine 130, a similarity is calculated by a main classification scheme, and it is corrected by a sub classification scheme, with reference to a unit 140 that includes classification information for each class. A class to which the inputted document belongs, is determined using the corrected similarity and is outputted to a classification output unit 150.

Figure 2:
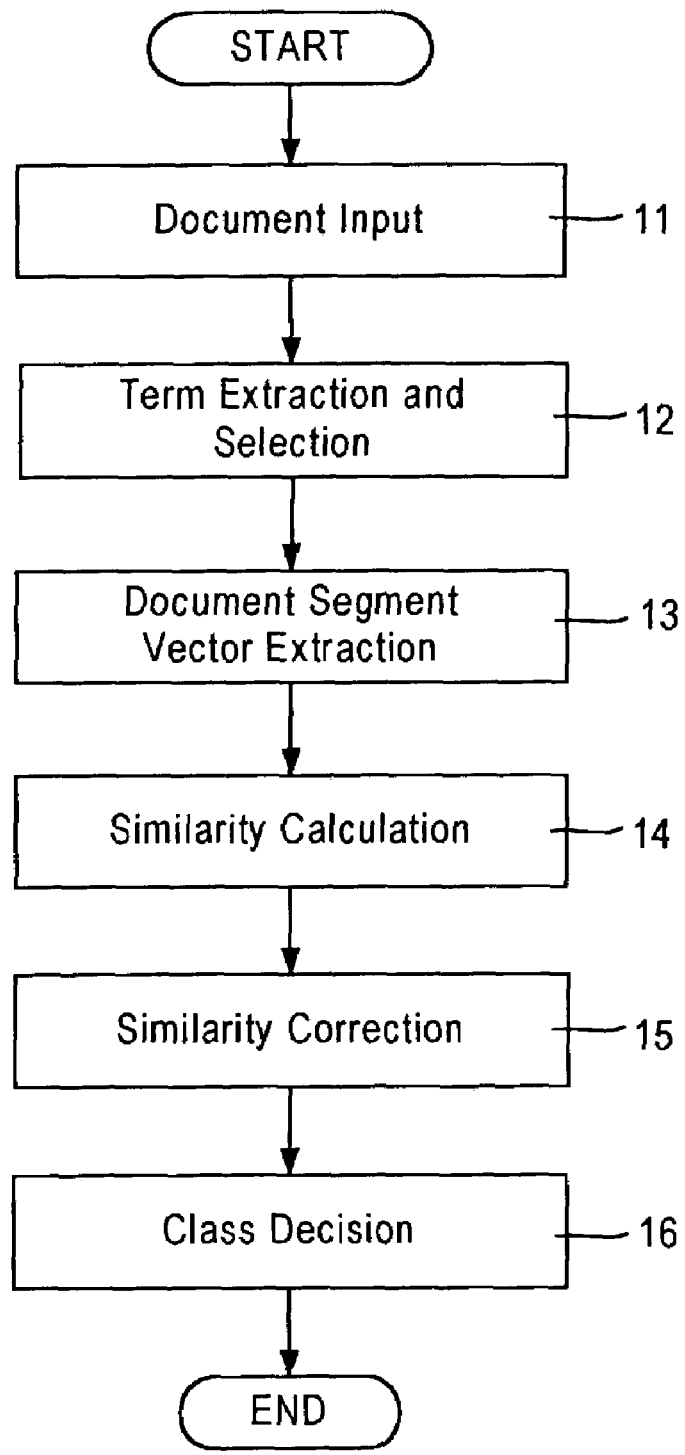
FIG. 2 is a flowchart of an embodiment of the present invention.

FIG. 2 is a flowchart of the processing steps the apparatus of FIG. 1 performs, from document input to class decision. The document is supplied to unit 110 during input step 11. During step 12, unit 120 extracts and selects terms. During step 13, unit 120 extracts a document segment vector. During steps 14 and 15, engine 130 respectively performs similarity calculation and similarity correction. During step 16, unit 140 makes a class decision. The steps 11 to 14 correspond to the main classification scheme, while the steps 15 and 16 correspond to the sub classification scheme. An example is described below using an English language document.

First, the document to be classified is inputted at the document input step 11. At the term extraction and selection step 12, words, equations, a series of symbols, etc. are extracted from the document. All the words and series of symbols are hereinafter referred to as "terms". In case of the written English language, a notation method in which the words are separately written has been established, and hence, the detection of the terms is easy. At the term extraction and selection step 12, terms that are included in a term list for use in classification are extracted from among the terms that occur in the input document. The selection of the terms for use in the classification can be effected using a large quantity of labeled training documents, and a tf-idf (term frequency-inverse document frequency) technique, a method employing $\chi_2$ statistics, a method employing mutual information, etc. are examples of known methods affording favorable results. The document segment vector extraction step 13 divides the document into document segments, and creates a vector for every document segment. The most fundamental processing in the division of the document into the document segments is division into sentence units. In the written English language, a sentence ends in a period and is followed by a space, so that the sentence can be easily extracted. Other methods of dividing a document into document segments include a method in which plural sentences are collected into the document segments so that the numbers of the terms of the document segments are substantially equal, and a method in which the document is divided from its head irrespective of sentences so that the numbers of terms included in the document segments are substantially equal, etc. It is also possible to use the whole document as one document segment. Subsequently, a vector is created for every document segment. The components of the vector represent the frequencies of the individual terms for use in the classification, in the pertinent document segment. Alternatively, the frequencies are multiplied by weights. There has been research on how to set the weights, and effective methods of setting the weights are known to those skilled in the art. A vector that is generated by adding up all of the document segment vectors is called the "document vector". The ensuing description assumes that a sentence vector is the document segment vector. When an input document X consisting of K sentences (FIG. 3A) is inputted, the k-th sentence vector is denoted by $x_k$ (FIG. 3B), and the document vector by x (FIG. 3C). Numerals on the bottom of FIG. 3B exemplify the components of the sentence vector. That is, the numerals indicate the frequencies of the terms corresponding to the respective components of the sentence vector $x_k$.

The similarity calculation step 14 (FIG. 2) calculates the similarity of the input document to each class. Various methods are also known for finding the similarity. In case of the vector space model, the mean document vector of each class is found using a training corpus and is saved. Letting the mean vector of class 1 be $m_1$, the similarity sim(X, 1) of the input document to the class 1 can be expressed by:

$$\text{sim}(X, 1) = x^T m_1 / (\|x\| \|m_1\|) \quad (1)$$

Here, $\|x\|$ denotes the norm of x and superscript T represents vector transpose.

Figure 4:
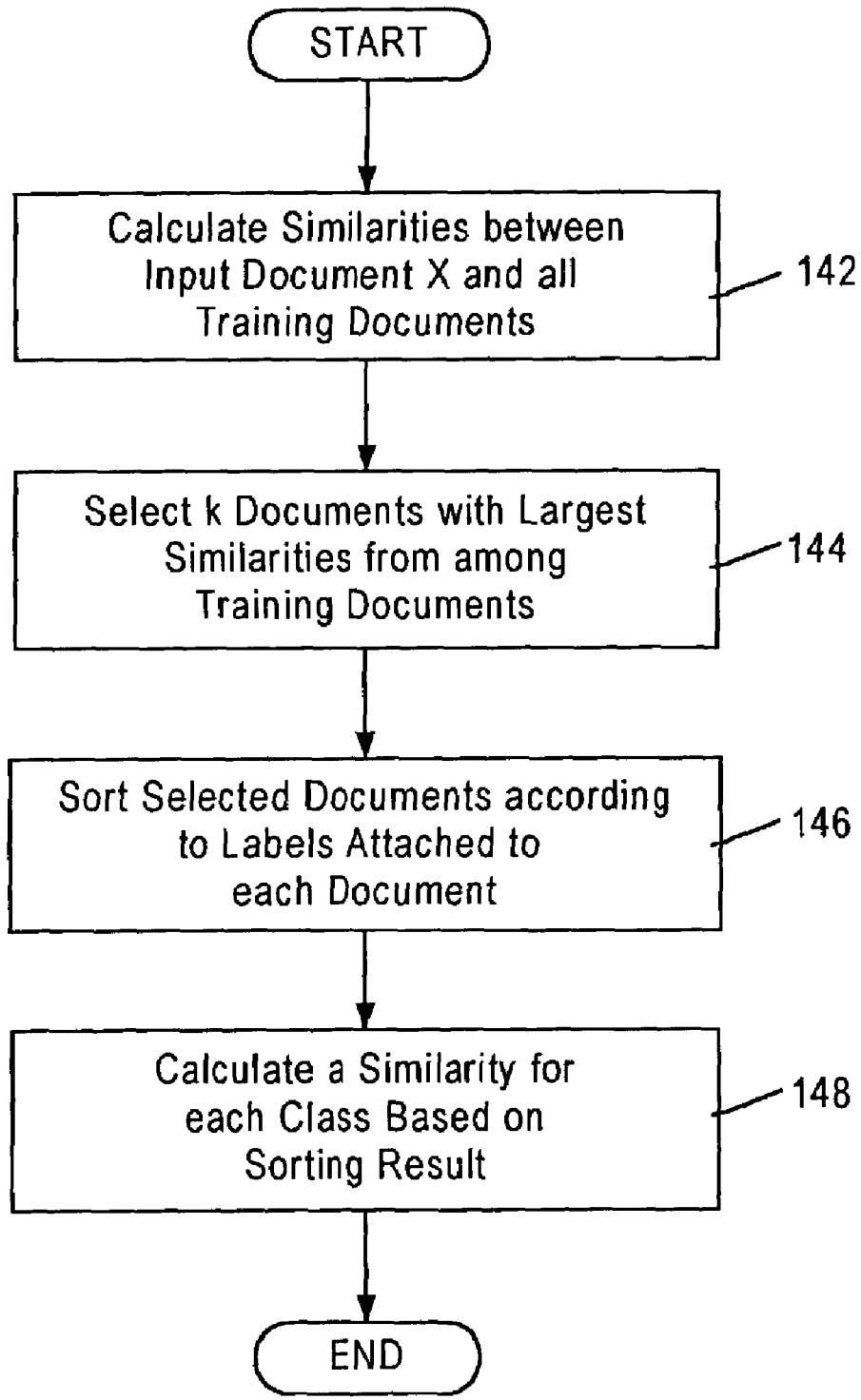
FIG. 4 is a flowchart of the steps for calculating the similarity of an input document (step 14 in FIG. 2) in conformity with the kNN method.

The kNN method performed by the apparatus of FIG. 1 will now be described with reference to the flowchart shown in FIG. 4. In the kNN method, letting $Y_t$ denote the t-th document in a training document set, and letting $y_t$ denote the document vector of the t-th document, the similarity sim(X, $Y_t$) of the input document X to the document $Y_t$ is obtained by:

$$\text{sim}(X, Y_t) = x^T y_t / (\|x\| \|y_t\|) \quad (2)$$

After the similarities of the input document X to all of the training documents have been obtained (step 142), k documents whose similarities to the input document X are the largest are selected (step 144). Thereafter, the k selected documents are sorted for every class according to labels attached to each document (step 146). Subsequently, the similarity sim(X, 1) of the input document to the class 1 is calculated (step 148). The similarity sim(X, 1) is defined as the summation of the similarities of the input document X to the documents sorted into the class 1. That is, it is calculated by:

$$\text{sim}(X, l) = \sum_{Y_t \in \Omega_l} \text{sim}(X, Y_t) \quad (3)$$

Here, $\Omega_1$ denotes the set of the training documents belonging to the class 1 among k documents.

At the similarity correction step 15 (FIG. 2), the similarity is corrected using positive topic difference factor vectors and negative topic difference factor vectors that have been saved for every class. The positive topic difference factor vectors of the class 1 for use in the similarity correction are denoted by $\{\alpha_i\}$ (i=1, . . . , $L_G$), and the negative topic difference factor vectors are denoted by $\{\beta_i\}$ (i=1, . . . , $L_P$). Then, a corrected similarity to the class 1 as denoted by $\text{sim}_C(X, 1)$ is given by:

$$\text{sim}_c(X, l) = \text{sim}(X, l) + a \sum_{i=1}^{L_G} \sum_{k=1}^{K} (x_k^T \alpha_i)^2 - b \sum_{i=1}^{L_P} \sum_{k=1}^{K} (x_k^T \beta_i)^2 \quad (4)$$

Note that a and b are parameters of positive values and have been previously determined together with $L_P$ and $L_G$. The values of the parameters a, b, $L_P$ and $L_G$ can be determined such that performances for a document set not used for the calculations of the vectors $\{\alpha_i\}$ and $\{\beta_i\}$ are found while the values of the respective parameters a, b, $L_P$ and $L_G$ are being changed in succession, and such that the combination of the values affording the maximum F measure is selected. The F measure is defined as follows:

$$\text{Precision} = \frac{\text{(Total number of classes correctly assigned to each document as the result of classification)}}{\text{(Total number of classes assigned to each document as the result of classification)}}$$

$$\text{Recall} = \frac{\text{(Total number of classes correctly assigned to each document as the result of classification)}}{\text{(Total number of classes to which each document ought to belong)}}$$

F measure=Precision×Recall×2/(Precision+Recall)

The corrected similarity $\text{sim}_C(X, 1)$ is calculated by the following equation:

$$\text{sim}_c(X, l) = \text{sim}(X, l) + \sum_{i=1}^{L_G} \sum_{k=1}^{K} a_i (x_k^T \alpha_i)^2 - \sum_{i=1}^{L_P} \sum_{k=1}^{k} b_i (x_k^T \beta_i)^2 \quad (5)$$

Figure 5:
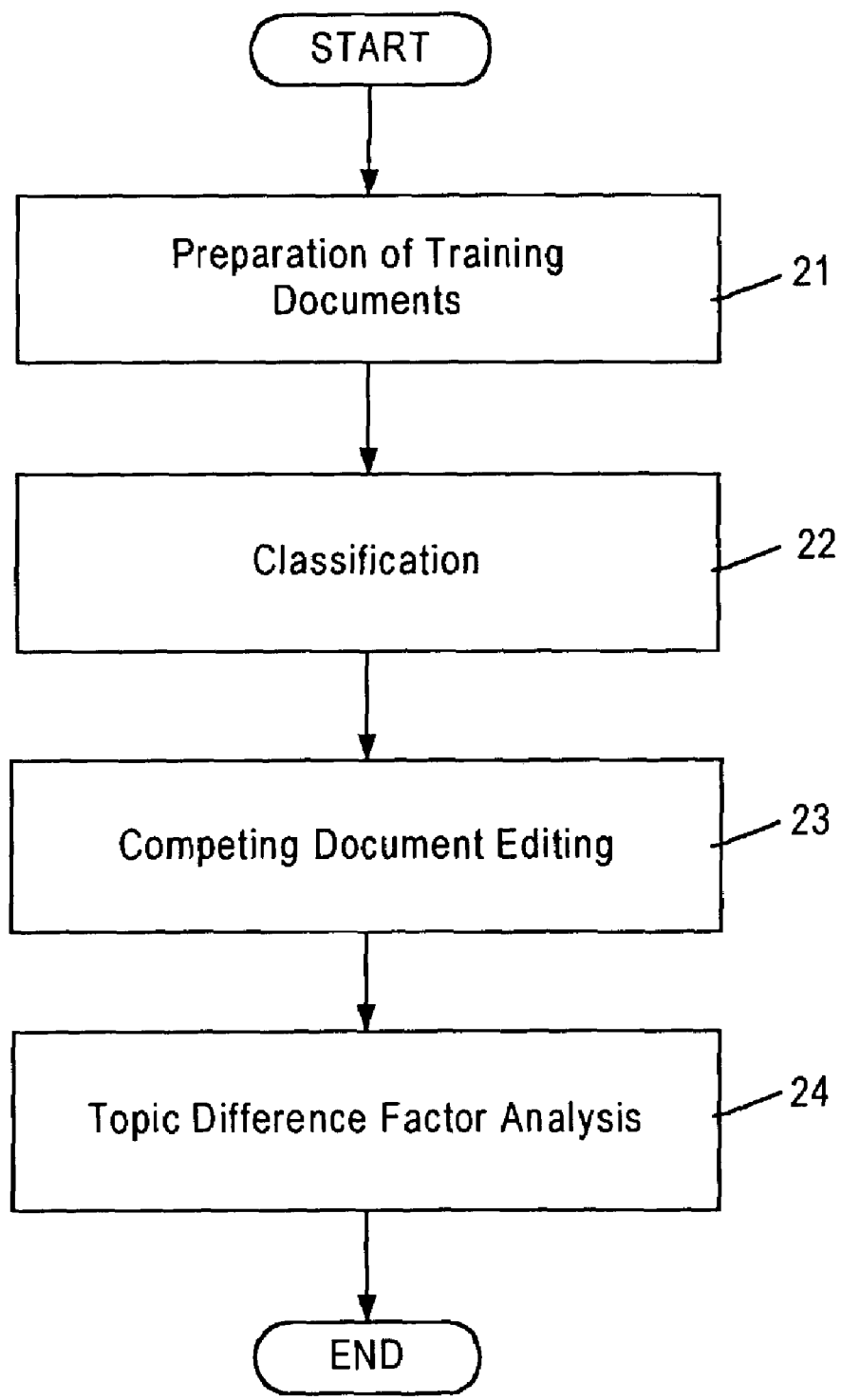
FIG. 5 is a flowchart of the steps for obtaining positive and negative topic difference factor vectors in order to correct the similarity, by using the document set of a given class and a document set which was misclassified into the given class or which was likely to be misclassified thereinto.

In this case, $a_i$ and $b_i$ are weights for the i-th positive topic difference factor and the i-th negative one, respectively. When $L_P$ and $L_G$ are given, the optimum values of the weights $a_i$ and $b_i$ can be obtained by employing a linear discriminant analysis. More specifically, a vector of $L_P + L_G + 1$ dimensions is prepared for every document not used for the calculations of the vectors $\{\alpha_i\}$ and $\{\beta_i\}$, and $(x^{iT}\alpha_i)^2$ (i=1, . . . , $L_P$) and sim(X, 1) are given as components. Subsequently, the linear discriminant analysis is conducted between the document set of the class 1 and a document set belonging to another class, and weights which optimally separate both the document sets are determined for the respective components. The "document set belonging to another class" signifies documents that belong to another class in which the similarity sim(X, 1) to the class 1 exceeds a certain threshold, as the result of classification at a classification step 22 (FIG. 5). It is generally said that, with the linear discriminant analysis, a projection axis that optimally separates two groups of vector sets can be found. The projection axis is calculated so that a difference vector between the mean vectors of the respective groups is multiplied by an inverse matrix of a matrix in which the covariance matrices of the respective groups have been added. Thereafter, the weights for $(x_k^T \alpha_i)^2$ (i=1, ..., $L_G$) and $(x_k^T \beta_i)^2$ (i=1, ..., $L_P$) are divided by weight for sim(X, 1), whereby $a_i$ and $b_i$ can be determined, respectively. Such processing is executed for all of the combinations of the values of $L_P$ and $L_G$, and the values of the weights $a_i$ and $b_i$ affording the best classified results may be adopted.

At the class decision 16 (FIG. 2), the class to which the input document belongs is determined by a comparison between a predetermined threshold for each class and the corrected similarity. If the corrected similarity for the class 1 is larger than the threshold for the class 1, a determination is made that the input document belongs to the class 1.

FIG. 5 is a flowchart of the steps for determining the positive topic difference factor vector and the negative topic difference factor vector that serve to correct the similarity at the step 15 in FIG. 2. During step 21, training documents are prepared. During step 22, classification occurs. During step 23, document set editing is completed. During step 24, a topic difference factor analysis is effected.

At the training document preparation step 21, the set of training documents for determining the positive and negative topic difference factor vectors is prepared, and the document vector and document segment vectors are obtained for each of the documents. At the subsequent classification step 22, each training document is selected as the input document so as to calculate its similarities to all of the other training documents and thereby determine the class to which it belongs (steps 14 and 16 in FIG. 2). All of the training documents are sorted by executing such operations. In this case, however, the similarity correction at the step 15 in FIG. 2 is not executed.

Figure 7:
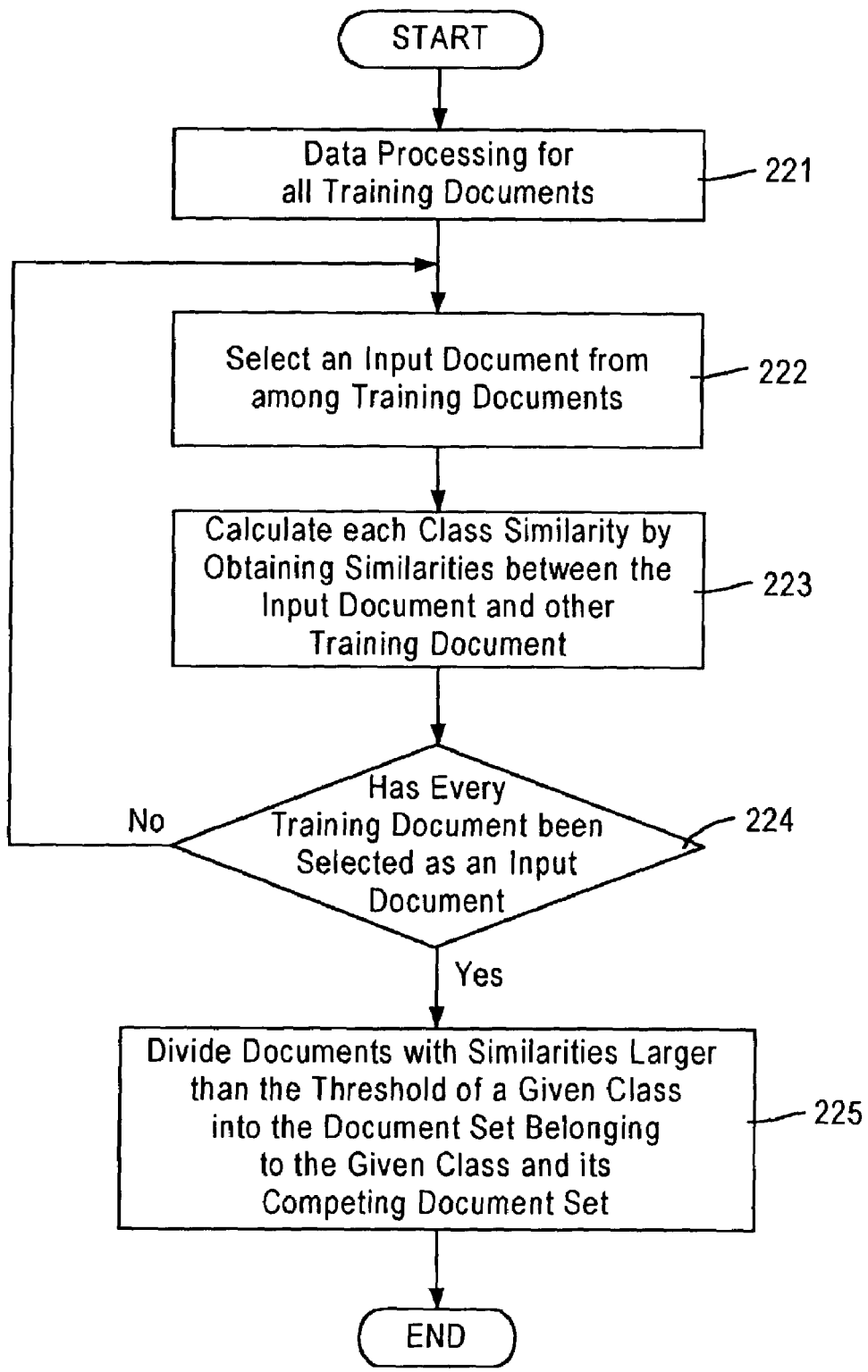
FIG. 7 is a flowchart of steps for classification (step 22 in FIG. 5).

The classification step 22 in FIG. 5 is described below with reference to the flowchart of FIG. 7.

Step 221: Data processing such as term extraction and document segment extraction is executed for all of the training documents.

Step 222: One of the training documents is selected as the input document.

Step 223: The similarities between the input document and the other training documents are calculated to obtain similarities to respective classes in accordance with Eq. (3).

Step 224: A determination is made as to whether the similarities to the respective classes have been obtained for all of the training documents.

Step 225: Documents whose similarities are larger than the threshold of a given class are divided into a document set that includes correctly classified documents and its competing document set that includes misclassified documents.

Figure 6A:
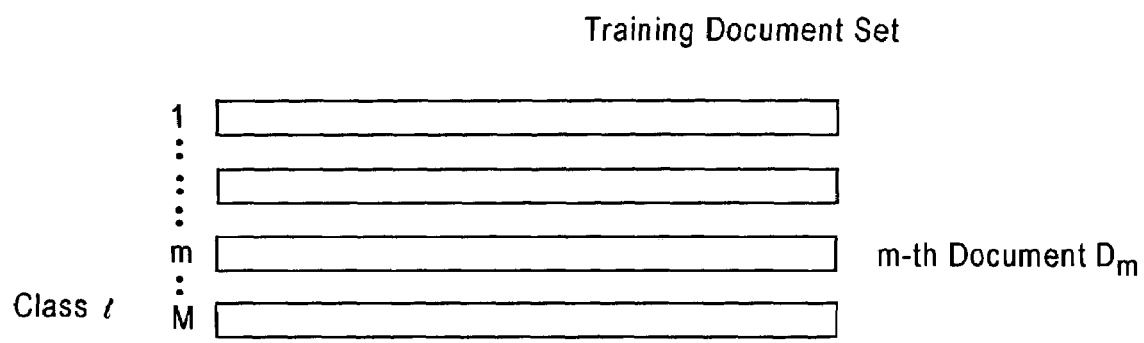
FIGS. 6A–6C are diagrams of the construction of documents belonging to a class 1.
Figure 6B:
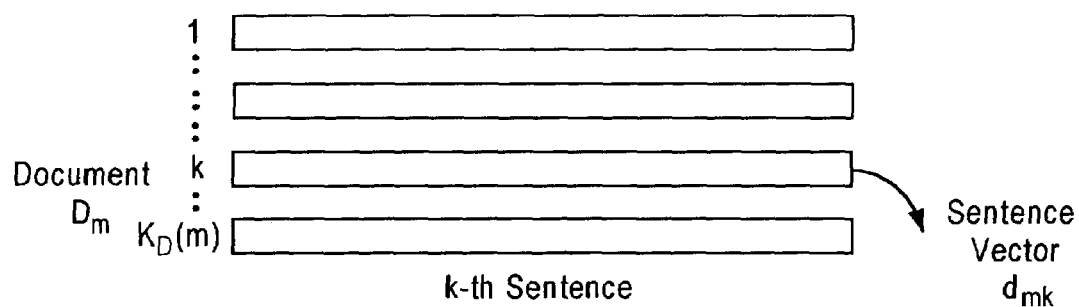
Figure 6C:
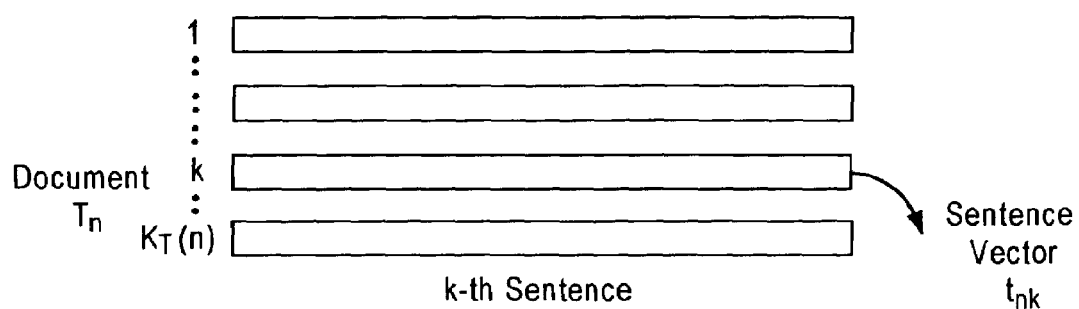

Now, the flowchart of FIG. 5 is described in detail. The set of M documents, correctly classified as belonging to the class 1, is denoted by D (FIG. 6A). Assuming that the m-th document $D_m$ of the set D consists of $K_D(m)$ sentences, the k-th sentence vector is denoted by $d_{mk}$ (FIG. 6B). The competing document set editing step 23 (FIG. 5) creates the set of competing documents each of which was misclassified into class 1 or was likely to be misclassified thereinto, every class on the basis of the classified result at the classification step 22. Any competing document with the class 1 is extracted by selecting a document whose similarity sim(X, 1) to the class 1 exceeds a certain threshold. The threshold can be arbitrarily determined depending upon the number of competing documents to-be-selected. A competing document set T with the class 1 is assumed to consist of N documents. The n-th document $T_n$ of the set T is assumed to consist of $K_T(n)$ sentences, and the k-th sentence vector is denoted by $t_{nk}$ (FIG. 6C). The topic difference factor analysis step 24 (FIG. 5) calculates positive and negative topic difference factor vectors using the document set belonging to each class and its competing document set. A projection axis that is to be found as the positive topic difference factor vector is denoted by $\alpha$. Letting $P_D$ and $P_T$ denote the sums of squared projection values in the case where all the sentence vectors of the document sets D and T are projected onto the axis $\alpha$, respectively, the positive topic difference factor vector is obtained as the $\alpha$ which maximizes a criterion function $J(\alpha)=P_D(\alpha)/P_T(\alpha)$. The $\alpha$ which maximizes $J(\alpha)$ reflects features which can exist in the document set D, but which rarely exist in the document set T, for the reason that it ought to have a large value as the sum of the squared projection values of the sentence vectors of the document set D and a small value as the sum of the squared projection values of the sentence vectors of the document set T. In this case, $P_D(\alpha)$ and $P_T(\alpha)$ are respectively represented as:

$$P_D(\alpha) = \sum_{m=1}^{M} \sum_{k=1}^{K_D(m)} (d_{mk}^T \alpha)^2 = \alpha^T S_D \alpha \tag{6}$$

$$S_D = \sum_{m=1}^{M} \sum_{k=1}^{K_D(m)} d_{mk} d_{mk}^T \tag{7}$$

$$P_T(\alpha) = \sum_{n=1}^{N} \sum_{k=1}^{K_T(n)} (t_{nk}^T \alpha)^2 = \alpha^T S_T \alpha \tag{8}$$

$$S_T = \sum_{n=1}^{N} \sum_{k=1}^{K_T(n)} t_{nk} t_{nk}^T \tag{9}$$

Therefore, the criterion function $J(\alpha)$ can be written as:

$$J(\alpha) = \frac{P_D(\alpha)}{P_T(\alpha)} = \frac{\alpha^T S_D \alpha}{\alpha^T S_T \alpha} \tag{10}$$

The $\alpha$ that maximizes the criterion function $J(\alpha)$ given by Eq. (10) can be obtained by differentiating Eq. (10) by $\alpha$ and then setting the result equal to zero. That is, it is given as the eigenvector of the following generalized eigenvalue problem:

$$S_D \alpha = \lambda S_T \alpha \tag{11}$$

A plurality of eigenvectors can be usually obtained from Eq. (11), and the first to $L_G$-th eigenvectors selected from among them become the positive topic difference factor vectors $\{\alpha_i\}$ (i=1, ... $L_G$) at the step 15 in FIG. 2. If $\beta$ denotes the other projection axis which is to be found, and if $J(\beta)=P_T(\beta)/P_D(\beta)$ denotes a criterion function, then the axis $\beta$ which maximizes the criterion function $J(\beta)$ represents features which should exist in the document set T, but which rarely exist in the document set D. In this case, the $\beta$ which maximizes the criterion function $J(\beta)$ is given as the eigenvector of the following generalized eigenvalue problem, likewise to Eq. (11):

$$S_T \beta = \lambda S_D \beta \tag{12}$$

The first to $L_P$-th eigenvectors selected from among a plurality of eigenvectors obtained from Eq. (12) become the negative topic difference factor vectors $\{\beta_i\}$ (i=1, ... $L_P$) at the step 15 in FIG. 2. In the case of Eq. (11), the matrix $S_T$ must be a regular matrix for the eigenvectors to be obtained. In actuality, however, the matrix $S_T$ cannot be obtained as a regular matrix in a case where the number of sentences in the training document set is smaller than the number of terms, or where a certain number of term pairs always co-occur. In such a case, it is permitted to obtain the eigenvectors by regularizing the matrix $S_T$ in accordance with the following equation:

$$\hat{S}_T = S_T + \sigma^2 I \quad (13)$$

where $\sigma^2$ denotes a parameter, and I denotes the identity matrix. In case of employing Eq. (13), the criterion function $J(\alpha)$ corresponds to the following:

$$J(\alpha) = P_D(\alpha)/(P_T(\alpha) + \sigma^2) \quad (14)$$

In the above embodiment, the lengths of the document and sentences are not taken into consideration. Accordingly, even when the similarity of the input document to each class has been obtained without regard to the length of the document, there arises the problem that the correction magnitude of the similarity enlarges more for a longer document, or that the correction magnitude of the similarity is more influenced by a longer sentence. At the step 15 in FIG. 2, therefore, Eq. (4) can be replaced by:

$$sim_c(X, l) = sim(X, l) + a \sum_{i=1}^{L_G} \sum_{k=1}^{K} (x_k^T \alpha_i)^2 / K - b \sum_{i=1}^{L_P} \sum_{k=1}^{K} (x_k^T \beta_i)^2 / K \quad (15)$$

As stated before, K denotes the number of sentences in the input document X. Thus, the influence of the length of the document can be reduced. The same holds true of Eq. (5). Alternatively, letting $N_k$ denote the number of terms occurring in the k-th sentence of the input document, Eq. (4) may well be replaced by:

$$sim_c(X, l) = sim(X, l) + a \sum_{i=1}^{L_G} \sum_{k=1}^{K} (x_k^T \alpha_i)^2 / N_k - b \sum_{i=1}^{L_P} \sum_{k=1}^{K} (x_k^T \beta_i)^2 / N_k \quad (16)$$

Thus, the influence of discrepancy in the length of the sentence can be reduced. The same holds true of Eq. (5).

Further, the sentence vector $x_k$ of the input document in FIG. 3B may well be normalized as follows, so as to apply the normalized vector to Eqs. (4), (5), (15) and (16):

$$\hat{x}_k = x_k / \|x_k\| \quad (17)$$

The positive and negative topic difference factor vectors can be obtained by similarly normalizing the sentence vectors $d_{mk}$ and $t_{nk}$ in FIGS. 6B and 6C.

As described above, according to the present invention, the distinctive information of each class can be used for classification, and hence, the precision of the classification can be remarkably heightened. In an experiment employing Reuters-21578 (where the number of training documents was 7770, the number of categories was 87, and the number of test documents was 3019), the data of the prior-art kNN method in which the corrections of the present invention were not made demonstrated a precision of 85.93%, a recall of 81.57% and an F measure of 83.69%. In contrast, the precision, recall and F measure were respectively enhanced to 90.03%, 84.40% and 87.14% by making the corrections of similarities based on Eq. (16) in accordance with the present invention.

|  | Precision | Recall | F measure |
|---|---|---|---|
| Prior-art kNN method | 85.93% | 81.57% | 83.69% |
| Method according to the present invention | 90.03% | 84.40% | 87.14% |

The definitions of the precision, recall and F measure are as stated before, and one document can belong to a plurality of classes in Reuters-21578.

This concludes the description of the example embodiments. Although the present invention has been described with reference to a number of illustrative embodiments thereof, it should be understood that numerous other modifications and embodiments can be devised by those skilled than the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of classifying a given input document into at least one document class, the method using a machine readable code embodied in a computer readable medium and that is executable using a computer, comprising:
   classifying the given input document via:
   (a) selecting terms for use in the classification, from among terms that occur in the input document;
   (b) dividing the input document into document segments in predetermined units;
   (c) generating document segment vectors whose components are values relevant to occurrence frequencies of the selected terms occurring in the document segments, and generating a document vector in which all of the document segment vectors are added together;
   (d) calculating a similarity between the input document and each class using information saved for every document class;
   (e) correcting the similarity to each class; and
   (f) determining and outputting the class to which the input document belongs in accordance with the corrected similarity to each class;
   wherein the similarity to each class is corrected by:
   adding a weighted sum of squared inner products between at least one positive topic difference factor vector saved for every document class and the respective document segment vectors, to the similarity of the input document to each class; and
   further correcting the similarity by subtracting a weighted sum of squared inner products between at least one negative topic difference factor vector saved for every document class and the respective document segment vectors from the similarity to each class.

2. The document classification method as defined in claim 1, wherein the positive and negative topic difference factor vectors of each class for use in the correction of the similarity are determined by:
   (a) calculating similarities between training documents included in a given training document set and individual classes, and classifying the training documents;

(b) finding a set of competing documents each of which has a similarity exceeding a threshold selected for each class, in spite of belonging to another class, on the basis of a classified result of the training document set;

(c) finding the positive topic difference factor vector of each class as a projection axis which maximizes a fraction whose numerator is a sum of squared projection values obtained when the document segment vectors of all or selected documents belonging to the pertinent class are projected onto the projection axis, and whose denominator is a sum of squared projection values obtained when the document segment vectors of the competing documents of the pertinent class are projected onto the projection axis; and (d) finding the negative topic difference factor vector of each class as a projection axis which maximizes a fraction whose denominator is the sum of squared projection values obtained when the document segment vectors of all or selected documents belonging to the pertinent class are projected onto the projection axis, and whose numerator is the sum of squared projection values obtained when the document segment vectors of the competing documents of the pertinent class are projected onto the projection axis.

3. The document classification method as defined in claim 1, wherein the document segment vectors and the document vector are normalized by dividing them by their respective norms.

4. The document classification method as defined in claim 1, wherein the weighted sum of squared inner products between each of the positive and negative topic difference factor vectors and the document segment vectors is normalized by dividing them by the number of terms included in the document segments.

5. The document classification method as defined in claim 1, wherein the weighted sum of squared inner products between each of the positive and negative topic difference factor vectors and the document segment vectors is normalized by dividing them by the number of document segments included in the input document.

6. An apparatus having a document input unit, a data processing unit, a classification engine, a classification information unit, and a classification output unit, to classify a given input document into at least one previously defined document class, the apparatus comprising:

(a) a selector to select terms for use in the classification from among terms that occur in the input document entered into the document input unit;

(b) a divider to divide the input document into document segments in predetermined units;

(c) a vector generator to generate document segment vectors whose components are values relevant to occurrence frequencies of the selected terms occurring in the document segments, and to generate a document vector in which the document segment vectors are added together;

(d) a first calculator to calculate a similarity between the input document and each class using information saved for every document class beforehand;

(e) an adder to add a weighted sum of squared inner products between at least one positive topic difference factor vector saved for every document class beforehand and the respective document segment vectors, to the similarity of the input document to each class;

(f) a subtractor to subtract a weighted sum of squared inner products between at least one negative topic difference factor vector saved for every document class beforehand and the respective document segment vectors, from the similarity to each class; and (g) a determinator to determine and output the class to which the input document belongs in accordance with the corrected similarity to each class.

7. The apparatus as defined in claim 6, wherein the positive and negative topic difference factor vectors of each class for use in the correction of the similarity are determined by:

(a) a second calculator to calculate similarities between training documents included in a given training document set and individual classes, and to classify the training documents;

(b) a first finder to find a set of competing documents each of which has a similarity exceeding a predetermined threshold for each class, in spite of belonging to another class, on the basis of the classified result of the training document set;

(c) a second finder to find the positive topic difference factor vector of each class as a projection axis which maximizes a fraction whose numerator is a sum of squared projection values obtained when the document segment vectors of all or selected documents belonging to the pertinent class are projected onto the projection axis, and whose denominator is a sum of squared projection values obtained when the document segment vectors of the competing documents of the pertinent class are projected onto the projection axis; and (d) a third finder to find the negative topic difference factor vector of each class as a projection axis which maximizes a fraction whose denominator is the sum of squared projection values obtained when the document segment vectors of all or selected documents belonging to the pertinent class are projected onto the projection axis, and whose numerator is the sum of squared projection values obtained when the document segment vectors of the competing documents of the pertinent class are projected onto the projection axis.

8. A document classification method to classify a given input document into at least one document class, the method using a machine readable code embodied in a computer readable medium and that is executable using a computer, comprising:

(a) selecting terms for use in the classification, from among terms that occur in the input document;

(b) calculating a similarity between the input document and each class using information saved for every document class beforehand;

(c) correcting the calculated similarity; and (d) determining and outputting the class to which the input document belongs in accordance with the corrected similarity to each class;

wherein the calculated similarity is corrected by the steps of:

adding a weighted sum of squared inner products between at least one positive topic difference factor vector saved for every document class beforehand and the respective document segment vectors, to the similarity of the input document to each class; and subtracting a weighted sum of squared inner products between at least one negative topic difference factor vector saved for every document class beforehand and the respective document segment vectors, from the similarity to each class.

9. The document classification method as defined in claim 8, wherein the positive and negative topic difference factor vectors of each class for use in the correction of the similarity are determined by the steps of:

(a) calculating similarities between training documents included in a given training document set and individual classes, and classifying the training documents;

(b) finding a set of competing documents each of which has a similarity exceeding a threshold selected for each class, in spite of belonging to another class, on the basis of a classified result of the training document set;

(c) finding the positive topic difference factor vector of each class as a projection axis which maximizes a fraction whose numerator is a sum of squared projection values obtained when the document segment vectors of all or selected documents belonging to the pertinent class are projected onto the projection axis, and whose denominator is a sum of squared projection values obtained when the document segment vectors of the competing documents of the pertinent class are projected onto the projection axis; and (d) finding the negative topic difference factor vector of each class as a projection axis which maximizes a fraction whose denominator is the sum of squared projection values obtained when the document segment vectors of all or selected documents belonging to the pertinent class are projected onto the projection axis, and whose numerator is the sum of squared projection values obtained when the document segment vectors of the competing documents of the pertinent class are projected onto the projection axis.

10. The document classification method as defined in claim 8, wherein the document segment vectors and the document vector are normalized by dividing them by their respective norms.

11. The document classification method as defined in claim 9, wherein the document segment vectors and the document vector are normalized by dividing them by their respective norms.

12. The document classification method as defined in claim 8, wherein the weighted sum of squared inner products between each of the positive and negative topic difference factor vectors and the document segment vectors is normalized by dividing them by the number of terms included in the document segments.

13. The document classification method as defined in claim 8, wherein the weighted sum of squared inner products between each of the positive and negative topic difference factor vectors and the document segment vectors is normalized by dividing them by the number of document segments included in the input document.

14. An apparatus having a document input unit, a data processing unit, a classification engine, a classification information unit, and a classification output unit, to classify a given input document into at least one previously defined document class, the apparatus comprising:

(a) a selector to select terms for use in the classification from among terms that occur in the input document entered into the document input unit;

(b) a first calculator to calculate a similarity between the input document and each class using information saved for every document class beforehand;

(c) a corrector to correct the similarity: and (d) a determinator to determine and output the class to which the input document belongs in accordance with the corrected similarity to each class;

wherein the corrector comprises:
an adder to add a weighted sum of squared inner products between at least one positive topic difference factor vector saved for every document class beforehand and the respective document segment vectors, to the similarity of the input document to each class; and a subtractor to subtract a weighted sum of squared inner products between at least one negative topic difference factor vector saved for every document class beforehand and the respective document segment vectors, from the similarity to each class.

15. The apparatus as defined in claim 14, further comprising a second calculator to calculate the positive and negative topic difference factor vectors of each class for use in the correction of the similarity, said second calculator comprising:

(a) a third calculator to calculate similarities between training documents included in a given training document set and individual classes, and to classify the training documents;

(b) a first finder to find a set of competing documents each of which has a similarity exceeding a predetermined threshold for each class, in spite of belonging to another class, on the basis of the classified result of the training document set;

(c) a second finder to find the positive topic difference factor vector of each class as a projection axis which maximizes a fraction whose numerator is a sum of squared projection values obtained when the document segment vectors of all or selected documents belonging to the pertinent class are projected onto the projection axis, and whose denominator is a sum of squared projection values obtained when the document segment vectors of the competing documents of the pertinent class are projected onto the projection axis; and (d) a third finder to find the negative topic difference factor vector of each class as a projection axis which maximizes a fraction whose denominator is the sum of squared projection values obtained when the document segment vectors of all or selected documents belonging to the pertinent class are projected onto the projection axis, and whose numerator is the sum of squared projection values obtained when the document segment vectors of the competing documents of the pertinent class are projected onto the projection axis.

16. A program storage device readable by a machine, tangibly embodying a program of instructions executable by the machine to perform a document classification method to classify a given input document into at least one document class, the method comprising the steps of:

(a) selecting terms for use in the classification, from among terms that occur in the input document;

(b) calculating a similarity between the input document and each class using information saved for every document class beforehand;

(c) correcting the calculated similarity; and (d) determining and outputting the class to which the input document belongs in accordance with the corrected similarity to each class;

wherein said correcting step (c) comprises the steps of:
adding a weighted sum of squared inner products between at least one positive topic difference factor vector saved for every document class beforehand and the respective document segment vectors, to the similarity of the input document to each class; and subtracting a weighted sum of squared inner products between at least one negative topic difference factor vector saved for every document class beforehand and the respective document segment vectors, from the similarity to each class.

17. The program storage device as defined in claim 16, wherein the method further comprises determining the positive and negative topic difference factor vectors of each class for use in the correction of the similarity by the steps of:

(a) calculating similarities between training documents included in a given training document set and individual classes, and classifying the training documents;

(b) finding a set of competing documents each of which has a similarity exceeding a threshold selected for each class, in spite of belonging to another class, on the basis of a classified result of the training document set;

(c) finding the positive topic difference factor vector of each class as a projection axis which maximizes a fraction whose numerator is a sum of squared projection values obtained when the document segment vectors of all or selected documents belonging to the pertinent class are projected onto the projection axis, and whose denominator is a sum of squared projection values obtained when the document segment vectors of the competing documents of the pertinent class are projected onto the projection axis; and (d) projection axis which maximizes a fraction whose denominator is the sum of squared projection values obtained when the document segment vectors of all or selected documents belonging to the pertinent class are projected onto the projection axis, and whose numerator is the sum of squared projection values obtained when the document segment vectors of the competing documents of the pertinent class are projected onto the projection axis.

18. The program storage device as defined in claim 16, wherein the method further comprises normalizing the document segment vectors and the document vector in the document classification method by dividing them by their respective norms.

19. The program storage device as defined in claim 17, wherein the method further comprises normalizing the document segment vectors and the document vector in the document classification method by dividing them by their respective norms.

20. The program storage device as defined in claim 16, wherein the method further comprises normalizing the weighted sum of squared inner products between each of the positive and negative topic difference factor vectors and the document segment vectors in the document classification method by dividing them by the number of terms included in the document segments.

21. The program storage device as defined in claim 16, wherein the method further comprises normalizing the weighted sum of squared inner products between each of the positive and negative topic difference factor vectors and the document segment vectors in the document classification method by dividing them by the number of document segments included in the input document.

22. An apparatus for classifying a given document into at least one document class, the apparatus comprising a processing arrangement for:

selecting terms for use in the classification, from among terms that occur in the input document;

dividing the input document into document segments in predetermined units;

generating document segment vectors whose components are values relevant to occurrence frequencies of the selected terms occurring in the document segments, and generating a document vector in which all of the document segment vectors are added together;

calculating a similarity between the input document and each class using information saved for every document class;

correcting the similarity to each class; and determining and outputting the class to which the input document belongs in accordance with the corrected similarity to each class;

wherein the similarity to each class is corrected by:

adding a weighted sum of squared inner products between at least one positive topic difference factor vector saved for every document class and the respective document segment vectors, to the similarity of the input document to each class; and further correcting the similarity by subtracting a weighted sum of squared inner products between at least one negative topic difference factor vector saved for every document class and the respective document segment vectors from the similarity to each class.

23. The apparatus as defined in claim 22, wherein said processing arrangement is further operable for determining the positive and negative topic difference factor vectors of each class for use in the correction of the similarity by:

calculating similarities between training documents included in a given training document set and individual classes, and classifying the training documents;

finding a set of competing documents each of which has a similarity exceeding a threshold selected for each class, in spite of belonging to another class, on the basis of a classified result of the training document set;

finding the positive topic difference factor vector of each class as a projection axis which maximizes a fraction whose numerator is a sum of squared projection values obtained when the document segment vectors of all or selected documents belonging to the pertinent class are projected onto the projection axis, and whose denominator is a sum of squared projection values obtained when the document segment vectors of the competing documents of the pertinent class are projected onto the projection axis; and finding the negative topic difference factor vector of each class as a projection axis which maximizes a fraction whose denominator is the sum of squared projection values obtained when the document segment vectors of all or selected documents belonging to the pertinent class are projected onto the projection axis, and whose numerator is the sum of squared projection values obtained when the document segment vectors of the competing documents of the pertinent class are projected onto the projection axis.

24. The apparatus as defined in claim 22, wherein said processing arrangement is further operable for determining the positive and negative topic difference factor vectors of each class for use in the correction of the similarity by:

calculating similarities between training documents included in a given training document set and individual classes, and classifying the training documents;

finding a set of competing documents each of which has a similarity exceeding a threshold selected for each class, in spite of belonging to another class, on the basis of a classified result of the training document set;

finding the positive topic difference factor vector of each class as a projection axis which maximizes a fraction whose numerator is a sum of squared projection values obtained when the document segment vectors of all or selected documents belonging to the pertinent class are projected onto the projection axis, and whose denominator is a sum of squared projection values obtained when the document segment vectors of the competing documents of the pertinent class are projected onto the projection axis; and finding the negative topic difference factor vector of each class as a projection axis which maximizes a fraction whose denominator is the sum of squared projection values obtained when the document segment vectors of all or selected documents belonging to the pertinent class are projected onto the projection axis, and whose numerator is the sum of squared projection values obtained when the document segment vectors of the competing documents of the pertinent class are projected onto the projection axis.

25. The apparatus as defined in claim 22, wherein said processing arrangement is further operable for normalizing the document segment vectors and the document vector by dividing them by their respective norms.

26. The apparatus as defined in claim 23, wherein said processing arrangement is further operable for normalizing the document segment vectors and the document vector by dividing them by their respective norms.

27. The apparatus as defined in claim 22, wherein said processing arrangement is further operable for normalizing the weighted sum of squared inner products between each of the positive and negative topic difference factor vectors and the document segment vectors by dividing them by the number of terms included in the document segments.

28. The apparatus as defined in claim 22, wherein said processing arrangement is further operable for normalizing the weighted sum of squared inner products between each of the positive and negative topic difference factor vectors and the document segment vectors by dividing them by the number of document segments included in the input document.

* * * * *